United States Patent
Takemoto

(10) Patent No.: US 8,089,643 B2
(45) Date of Patent: Jan. 3, 2012

(54) INFORMATION PROCESSING APPARATUS, INFORMATION PROCESSING METHOD, AND COMPUTER-READABLE RECORDING MEDIUM STORING INFORMATION PROCESSING PROGRAM

(75) Inventor: Yuji Takemoto, Tokyo (JP)

(73) Assignee: Ricoh Company Ltd., Tokyo (JP)

( * ) Notice: Subject to any disclaimer, the term of this patent is extended or adjusted under 35 U.S.C. 154(b) by 792 days.

(21) Appl. No.: 12/230,580

(22) Filed: Sep. 2, 2008

(65) Prior Publication Data

US 2009/0073494 A1    Mar. 19, 2009

(30) Foreign Application Priority Data

Sep. 5, 2007    (JP) ................ 2007-230510

(51) Int. Cl.
*H04N 1/40*    (2006.01)
*G06F 3/12*    (2006.01)

(52) U.S. Cl. ..................... 358/1.13; 358/445

(58) Field of Classification Search ............... 358/1.13, 358/404, 444, 468, 3.23, 443, 448, 470, 445, 358/451

See application file for complete search history.

(56) References Cited

U.S. PATENT DOCUMENTS

| | | | |
|---|---|---|---|
| 2003/0184803 A1 | 10/2003 | Yamada et al. | |
| 2004/0147315 A1* | 7/2004 | Monden | 463/31 |
| 2006/0075397 A1* | 4/2006 | Kasahara | 717/170 |
| 2006/0209353 A1 | 9/2006 | Harada et al. | |
| 2007/0273913 A1* | 11/2007 | Nakata | 358/1.14 |
| 2007/0283048 A1* | 12/2007 | Theimer et al. | 709/246 |
| 2008/0134165 A1* | 6/2008 | Anderson et al. | 717/173 |
| 2008/0180494 A1* | 7/2008 | Studer | 347/85 |
| 2008/0259409 A1* | 10/2008 | Nishizawa | 358/448 |
| 2008/0307128 A1* | 12/2008 | Amron et al. | 710/65 |
| 2009/0318125 A1* | 12/2009 | Normark et al. | 455/419 |

FOREIGN PATENT DOCUMENTS

| | | |
|---|---|---|
| JP | 2000-134441 | 5/2000 |
| JP | 2002-025182 | 1/2002 |
| JP | 2002-320079 | 10/2002 |
| JP | 2004-048349 | 2/2004 |
| JP | 2004-164092 | 6/2004 |
| JP | 2004-320255 | 11/2004 |
| JP | 2005-100187 | 4/2005 |
| JP | 2006-135816 | 5/2006 |

OTHER PUBLICATIONS

Office Action dated Oct. 25, 2011 issued in corresponding Japanese Application No. 2007-230510.

* cited by examiner

*Primary Examiner* — Jerome Grant, II
(74) *Attorney, Agent, or Firm* — Harness, Dickey & Pierce, P.L.C.

(57) ABSTRACT

An information processing apparatus which converts input image data having a data format before conversion into image data having a data format after conversion is disclosed. The information processing apparatus includes a data format storing unit which stores processing capability information of the information processing apparatus and information of the data formats after conversion by correlating the processing capability information with the information of the data formats after conversion, a processing capability information determining unit which determines the processing capability information of the information processing apparatus, and a data format conversion controlling unit which converts the input image data having the data format before conversion into the image data having the data format after conversion based on the determined result by the processing capability information determining unit by referring to the data format storing unit.

20 Claims, 10 Drawing Sheets

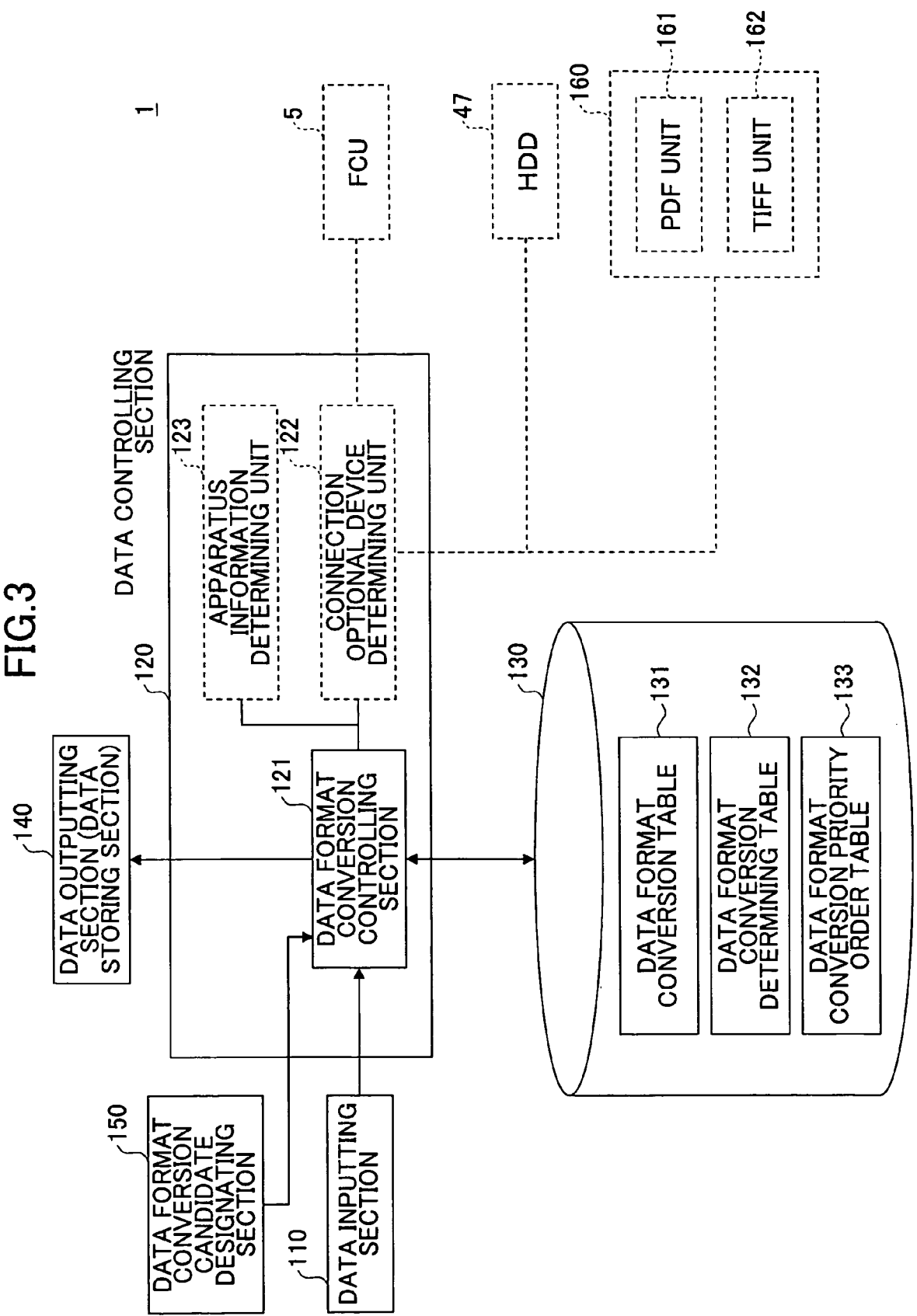

FIG.4A

| | DOMESTIC MARKET MODEL | | OVERSEAS MARKET MODEL | |
|---|---|---|---|---|
| | COLOR IMAGES | MONOCHROME IMAGES | COLOR IMAGES | MONOCHROME IMAGES |
| PRESENCE OF HDD | RGB | MONOCHROME | RAW (RGB) | RAW (MONOCHROME) |
| NON-PRESENCE OF HDD | PDF (JPEG) | TIFF (MMR) | PDF (JPEG) | TIFF (MMR) |

FIG.4B

|  |  | DOMESTIC MARKET MODEL | | OVERSEAS MARKET MODEL | |
|---|---|---|---|---|---|
|  |  | COLOR IMAGES | MONOCHROME IMAGES | COLOR IMAGES | MONOCHROME IMAGES |
| PRESENCE OF HDD | | RGB | MONOCHROME | RAW (RGB) | RAW (MONOCHROME) |
| NON-PRESENCE OF HDD | PRESENCE OF PDF(TIFF) UNIT | PDF | TIFF | PDF | TIFF |
|  | NON-PRESENCE OF PDF(TIFF) UNIT | JPEG | MMR | JPEG | MMR |

FIG.5

| DATA FORMAT AFTER CONVERSION / DATA FORMAT BEFORE CONVERSION | RAW (RGB) | RAW (MONOCHROME) | RGB | MONOCHROME | PDF (JPEG) | JPEG | TIFF (MMR) | MMR |
|---|---|---|---|---|---|---|---|---|
| RAW (RGB) | O | O | O | O | O | O | O | O |
| RAW (MONOCHROME) | x | O | x | O | O | O | O | O |
| RGB | x | x | O | O | O | O | O | O |
| ... | | | | | | | | |

FIG.6

| PRIORITY ORDER | DATA FORMAT |
|---|---|
| 1 | RAW(RGB) |
| 2 | RAW(MONOCHROME) |
| 3 | RGB |
| 4 | MONOCHROME |
| 5 | PDF(JPEG) |
| 6 | JPEG |
| 7 | TIFF(MMR) |
| 8 | MMR |
| 9 | UNCONVERTIBLE |

FIG.7A

| PRIORITY ORDER | DATA FORMAT |
|---|---|
| 1 | PDF(JPEG) |
| 2 | JPEG |
| 3 | TIFF(MMR) |
| 4 | MMR |
| 5 | RGB |
| 6 | MONOCHROME |
| 7 | RAW(RGB) |
| 8 | RAW(MONOCHROME) |
| 9 | UNCONVERTIBLE |

FIG.7B

| PRIORITY ORDER | DATA FORMAT |
|---|---|
| 1 | RAW(RGB) |
| 2 | RAW(MONOCHROME) |
| 3 | RGB |
| 4 | MONOCHROME |
| 5 | PDF(JPEG) |
| 6 | JPEG |
| 7 | TIFF(MMR) |
| 8 | MMR |
| 9 | UNCONVERTIBLE |

INFORMATION PROCESSING APPARATUS, INFORMATION PROCESSING METHOD, AND COMPUTER-READABLE RECORDING MEDIUM STORING INFORMATION PROCESSING PROGRAM

BACKGROUND OF THE INVENTION

1. Field of the Invention

The present invention generally relates to an information processing apparatus, an information processing method, and a computer-readable recording medium storing an information processing program.

2. Description of the Related Art

Conventionally, in information processing apparatuses such as a PC (personal computer), in many cases, independently operating application software and software modules process documents having corresponding different file formats (data formats).

In addition, in the information processing apparatuses such as an MFP (multifunctional Peripheral), data formats to be processed may be different among the MFPs depending on differences of such as models for a domestic market and an overseas market, using CPUs (central processing units), using OSs (operating systems), and connected optional devices.

When a document having a data format (file format) which is processed by application software or a software module is converted into a document having a different data format so that a user processes the document in a different apparatus, the user must obtain the differences of the models and the differences of the data formats in the models, and must select a data format which can be used in the different apparatus.

Patent Document 1 discloses an image processing apparatus. In the image processing apparatus, an application ID which has been stored beforehand in an IC card is obtained, and data attached to the application software which data have been stored in the IC card are read by using the obtained application ID.

With this, in the image processing apparatus, a document having a data format can be automatically selected from an external device such as the IC card by obtaining the application ID.

Patent Document 2 discloses a medium converting apparatus. In the medium converting apparatus, a data format is automatically selected by using a format converting table.

With this, in the medium converting apparatus, when plural media are used, user operations for copying files among different media and for processing data storing in the plural media can be easily executed.

[Patent Document 1] Japanese Laid-Open Patent Application No. 2005-100187

[Patent Document 2] Japanese Laid-Open Patent Application No. 2002-025182

However, in the above conventional technology, when a document having a data format which is processed by application software or a software module is converted into a document having a different data format so that a user processes the document in a different apparatus, the user must execute a complicated process for selecting the different data format.

In addition, since different definition files are used in the corresponding plural apparatuses, when an optional device is additionally connected to an apparatus, the apparatus must convert the definition file and must individually manage the data format.

SUMMARY OF THE INVENTION

In a preferred embodiment of the present invention, there is provided an information processing apparatus, an information processing method, and a computer-readable recording medium storing an information processing program in which input image data having a data format can be easily converted into image data having a different data format.

Features and advantages of the present invention are set forth in the description that follows, and in part will become apparent from the description and the accompanying drawings, or may be learned by practice of the invention according to the teachings provided in the description. Features and advantages of the present invention will be realized and attained by an information processing apparatus, an information processing method, and a computer-readable recording medium storing an information processing program particularly pointed out in the specification in such full, clear, concise, and exact terms so as to enable a person having ordinary skill in the art to practice the invention.

To achieve one or more of these and other advantages, according to one aspect of the present invention, there is provided an information processing apparatus which converts input image data having a data format before conversion (pre-converted data format) into image data having a data format after conversion (post-converted data format). The information processing apparatus includes a data format storing unit which stores processing capability information of the information processing apparatus and information of the data formats after conversion by correlating the processing capability information with the information of the data formats after conversion, a processing capability information determining unit which determines the processing capability information of the information processing apparatus, and a data format conversion controlling unit which converts the input image data having the data format before conversion into the image data having the data format after conversion based on the determined result by the processing capability information determining unit by referring to the data format storing unit.

According to another aspect of the present invention, there is provided an information processing method in an information processing apparatus which converts input image data having a data format before conversion into image data having a data format after conversion. The information processing method includes a data format storing step which stores processing capability information of the information processing apparatus and information of the data formats after conversion by correlating the processing capability information with the information of the data formats after conversion, a processing capability information determining step which determines the processing capability information of the information processing apparatus, and a data format conversion controlling step which converts the input image data having the data format before conversion into the image data having the data format after conversion based on the determined result by the processing capability information determining step by referring to the data format storing step.

According to another aspect of the present invention, there is provided a computer-readable recording medium storing an information processing program in an information processing apparatus which converts input image data having a data format before conversion into image data having a data format after conversion. The information processing program includes a data format storing step which stores processing capability information of the information processing apparatus and information of the data formats after conversion by correlating the processing capability information with the information of the data formats after conversion, a processing capability information determining step which determines the processing capability information of the information processing apparatus, and a data format conversion controlling step which converts the input image data having the data format before conversion into the image data having the data format after conversion based on the determined result by the processing capability information determining step by referring to the data format storing step.

Effect of the Invention

According to an embodiment of the present invention, the information processing apparatus includes a data format storing unit which stores processing capability information of the information processing apparatus and information of the data formats after conversion by correlating the processing capability information with the information of the data formats after conversion, a processing capability information determining unit which determines the processing capability information of the information processing apparatus, and a data format conversion controlling unit which converts the input image data having the data format before conversion into the image data having the data format after conversion based on the determined result by the processing capability information determining unit by referring to the data format storing unit. Therefore, input image data having a data format can be easily converted into image data having a different data format.

BRIEF DESCRIPTION OF THE DRAWINGS

Features and advantages of the present invention will become more apparent from the following detailed description when read in conjunction with the accompanying drawings, in which:

FIG. 3 is a diagram showing a functional structure of the information processing apparatus shown in FIG. 1;

FIG. 4A is a first table showing a data format conversion table shown in FIG. 3;

FIG. 4B is a second table showing the data format conversion table shown in FIG. 3;

FIG. 5 is a data format conversion determining table shown in FIG. 3;

FIG. 6 is a table showing a first example of a data format conversion priority order table shown in FIG. 3;

FIG. 7A is a table showing a second example of the data format conversion priority order table shown in FIG. 3;

FIG. 7B is a table showing a third example of the data format conversion priority order table shown in FIG. 3;

DESCRIPTION OF THE PREFERRED EMBODIMENT

Best Mode of Carrying Out the Invention

The best mode of carrying out the present invention is described with reference to the accompanying drawings.

In an embodiment of the present invention, as an information processing apparatus, an MFP (image forming apparatus) is used. However, as the information processing apparatus, a general-purpose computer can be used.

[Outline of Information Processing Apparatus]

Figure 1:
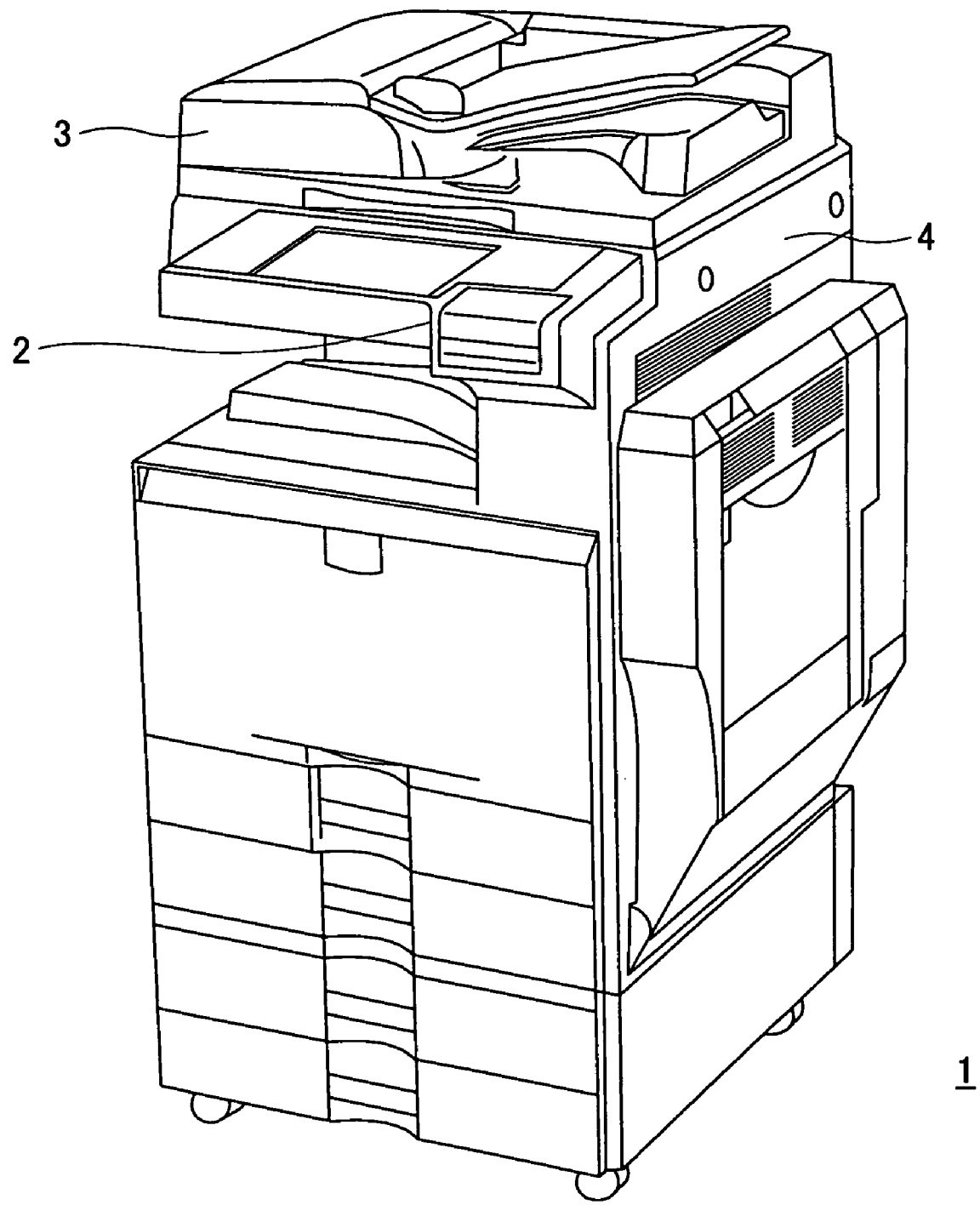
FIG. 1 is a perspective view of an information processing apparatus according to an embodiment of the present invention.

FIG. 1 is a perspective view of an information processing apparatus according to the embodiment of the present invention. As described above, in the embodiment of the present invention, as the information processing apparatus, an MFP 1 is used. The MFP 1 includes functions such as a copying function, a printing function, and a scanning function. As shown in FIG. 1, the MFP 1 includes an operating section 2, a document reading section 3, and a controller 4.

The operating section 2 includes a keyboard and a display such as a touch panel display so that a user inputs an instruction to the MFP 1 on the operating section 2 by an interactive system and a result of the instruction is displayed on the operating section 2. The document reading section 3 includes a scanner for reading a document as image data. The controller 4 controls all the elements in the MFP 1 so that the functions of the MFP 1 such as the copying function, the printing function, and the scanning function are realized.

In the MFP 1, a data format (file format) of, for example, image data read by the document reading section 3 or image data stored in the MFP 1 is converted into another data format corresponding to differences among models of the MFPs 1 and differences among optional devices connected to the MFPs 1. As described above, the MFPs 1 are different from each other depending on differences of models (for the domestic market and overseas markets), using CPUs, using OSs, and connected optional devices.

For example, when the MFP 1 includes an HDD (hard disk drive) having a large capacity, the data format of the image data is converted into a data format of high image quality which uses a large capacity. In addition, when the MFP 1 does not include an HDD or includes a HDD having a small capacity, the data format of the image data is converted into a compression data format in which the image data are compressed. That is, the MFP 1 can automatically convert the data format of the image data depending on the capacity of the HDD (storage unit).

Since the data format of the image data is automatically converted into a different data format, a user does not need to execute a complicated data format converting process. The image data whose data format has been converted are stored in a storage unit in the MFP 1 or in an external storage unit connected to the MFP 1 via a network.

[Hardware Structure of Information Processing Apparatus]

Figure 2:
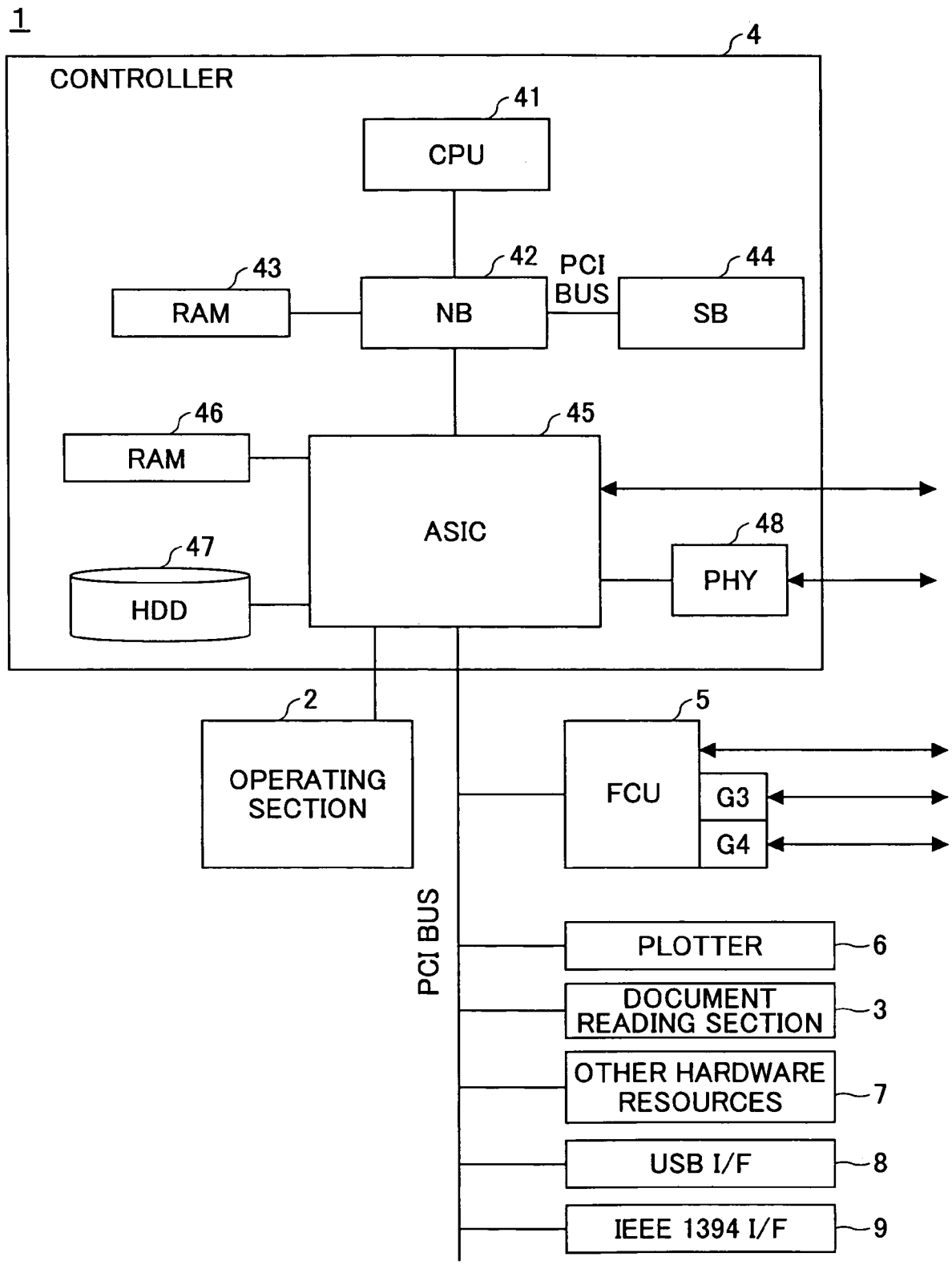
FIG. 2 is a diagram showing a hardware structure of the information processing apparatus shown in FIG. 1.

FIG. 2 is a diagram showing a hardware structure of the MFP 1 according to the embodiment of the present invention. As shown in FIG. 2, the MFP 1 includes the operating section 2, the document reading section 3 (scanner), the controller 4, an FCU (facsimile control unit) 5, a plotter 6, other hardware resources 7 (of the MFP 1), a USB I/F (interface) 8, and an IEEE 1394 I/F 9.

The controller 4 includes a CPU 41, an NB (north bridge) 42, a RAM 43, an SB. (south bridge) 44, an ASIC (application specific integrated circuit) 45, a RAM 46, an HDD 47, and a PHY (physical layer) 48.

The CPU 41 is a microprocessor for controlling all the elements in the MFP 1. The NB 42 is an IC chip for connecting the CPU 41 to the RAM 43, the SB 44, and the ASIC 45. The RAM 43 is a volatile memory unit for temporarily storing a program and processed data when the CPU 41 controls operations of the MFP 1. The SB 44 is an IC chip for connecting a PCI bus to the NB 42. The ASIC 45 processes image data. The RAM 46 is a volatile memory unit for temporarily storing a program and processed data when the ASIC 45 processes image data. The PHY 48 is an I/F for connecting the MFP 1 of an RS 232C to an external apparatus (not shown).

The FCU 5 controls facsimile operations when the MFP 1 transmits/receives image data to/from an external apparatus (not shown) via a network by using a facsimile function. In G3 facsimile, image data compressed by MH (Modified Huffman) coding or MR (Modified Read) coding are transmitted or received. In G4 facsimile, image data compressed by MMR (Modified Modified Read) coding are transmitted or received.

The plotter 6 prints out image data. Instead of using the plotter 6, a printer can be used. The USB I/F 8 connects the MFP 1 to an external USB device. The IEEE 1394 I/F 9 is a high-speed serial I/F for connecting the MFP 1 to an external IEEE 1394 device.

[Functional Structure of Information Processing Apparatus]

FIG. 3 is a diagram showing a functional structure of the MFP 1 according to the embodiment of the present invention. As shown in FIG. 3, the MFP 1 includes a data inputting section 110, a data controlling section 120, a table storing section 130, a data outputting section 140 (data storing section) (printout unit), and a data format conversion candidate designating section 150 (data format conversion candidate designating unit). The data inputting section 110 corresponds to the document reading section 3 shown in FIG. 1.

Referring to FIG. 3, in the MFP 1, a functional structure for converting a data format of image data input from the data inputting section 110 into another data format is described. In the embodiment of the present invention, a data format of input image data before being applied with a data format conversion process is referred to as a data format before conversion, and a data format of image data to which the data format conversion process has been applied is referred to as a data format after conversion.

The data inputting section 110 (data inputting unit) inputs image data having a data format before conversion to the MFP 1.

The data controlling section 120 applies processes to the image data input from the data inputting section 110. For example, the data controlling section 120 applies a data format conversion process to the input image data. The function of the data controlling section 120 is executed by the controller 4 shown in FIG. 2.

As shown in FIG. 3, the data controlling section 120 includes a data format conversion controlling section 121 (data format conversion controlling unit), a connection optional device determining unit 122, and an apparatus information determining unit 123. The connection optional device determining unit 122 and the apparatus information determining unit 123 form a processing capability information determining unit.

The data format conversion controlling section 121 controls converting the data format of the image data input from the data inputting section 110 by using the connection optional device determining unit 122, the apparatus information determining unit 123, and the table storing section 130. In addition, the data format conversion controlling section 121 can convert the data format of the image data into another data format based on a data format conversion candidate designated by the data format conversion candidate designating section 150. The data format conversion candidate designating section 150 is described below in detail.

Operations of the data format conversion controlling section 121 are described below in detail by referring to FIGS. 8 and 9. Briefly, the conversion of the data format of the image data corresponding to the information of the MFP 1 and the information of the connected optional device can be executed by using the connection optional device determining unit 122, the apparatus information determining unit 123, and the table storing section 130.

The connection optional device determining unit 122 determines whether an optional unit 160 is connected to the MFP 1 and some hardware (the FCU 5 or the HDD 47) is connected to the MFP 1. The optional unit 160 includes a PDF (portable document format) unit 161, and a TIFF (tagged image file format) unit 162. That is, the connection optional device determining unit 122 determines whether some hardware such as the FCU 5 and the HDD 47 is connected to the MFP 1, whether the free capacity of the connected HDD 47 is a predetermined value or more, and whether a software library such as the PDF unit 161 and the TIFF unit 162 is connected to the MFP 1.

The apparatus information determining unit 123 determines whether the MFP 1 is a model for a domestic market or an overseas market, whether the MFP 1 uses a predetermined CPU, and whether the MFP 1 uses a predetermined OS.

The table storing section 130 stores tables to be referred by the data format conversion controlling section 121. That is, the table storing section 130 stores a data format conversion table 131 (data format storing unit), a data format conversion determining table 132 (convertible data format information storing unit), and a data format conversion priority order table 133 (data format conversion priority order storing unit). The tables 131 through 133 are stored in, for example, the HDD 47.

Next, referring to the drawings, the tables 131 through 133 are described.

[Data Format Conversion Table]

Referring to FIGS. 4A and 4B, the data format conversion table 131 is described. FIG. 4A is a first table showing the data format conversion table 131. FIG. 4B is a second table showing the data format conversion table 131.

In the data format conversion table 131, processing capability information of the MFP 1 is correlated with data format after conversion information. The processing capability information of the MFP 1 includes the apparatus information of the MFP 1 and connection optional device information. The apparatus information includes destination information of the MFP 1; that is, the apparatus information is whether the MFP 1 is a domestic market model or an overseas market model. In addition, the apparatus information is whether the MFP 1 is capable of processing color images or monochrome images. The connection optional device information includes whether an HDD is installed in the MFP 1. The data format after conversion information includes, for example, "RGB" and "MONOCHROME". That is, in the data format conversion table, the data format after conversion information is described by being correlated with the processing capability information of the MFP 1.

The data format conversion controlling section 121 obtains information of a data format after conversion from the data format conversion table 131 which information is correlated with the processing capability information of the MFP 1 determined by the connection optional device determining unit 122 and the apparatus information determining unit 123. Then the data format conversion controlling section 121 converts the data format of the image data input from the data inputting section 110 into the data format after conversion.

In FIG. 4A, the data format after conversion is different between "PRESENCE OF HDD" and "NON-PRESENCE OF HDD". As shown in FIG. 4A, for example, when the MFP 1 is a "DOMESTIC MARKET MODEL" for "COLOR IMAGES", the data format after conversion is "RGB" at "PRESENCE OF HDD", and the data format after conversion is "PDF" at "NON-PRESENCE OF HDD".

At "PRESENCE OF HDD", it is assumed that the data storage area is sufficient; therefore, the data format is converted into "RGB" so that a high-quality image is formed. That is, in the "RGB" format, a high-quality image can be obtained by hardly or not applying a compression process to the image data; therefore, the "RGB" format has been set beforehand in the data format conversion table 131. At "NON-PRESENCE OF HDD", it is assumed that the data storage area is not sufficient; therefore, the data format is converted into "PDF" so that image data are compressed. That is, in the "PDF" format, in order not to use a large storage area, the image data are compressed. Therefore, the "PDF" format has been set beforehand in the data format conversion table 131.

As described above, the data format after conversion is different between a case in which the MFP 1 includes a large capacity non-volatile memory unit such as an HDD as an optional device and another case in which the MFP 1 does not include the large capacity non-volatile memory unit. That is, the MFP 1 includes the connection optional device determining unit 122 which determines whether a large capacity non-volatile memory unit such as an HDD is connected to the MFP 1 and the data format conversion table 131 in which the data format after conversion has been set beforehand depending on cases in which the large capacity non-volatile memory unit such as the HDD is connected to the MFP 1 or not.

As described above, since an optimum data format after conversion can be obtained depending on the processing capability information whether the MFP1 includes a large capacity non-volatile memory unit, the operability and convenience by a user can be increased in operations of the MFP 1.

In FIG. 4A, the data format after conversion is different between "PRESENCE OF HDD" and "NON-PRESENCE OF HDD". However, at the "PRESENCE OF HDD", a free capacity area in the non-volatile memory unit such as an HDD can be further considered. That is, the data format after conversion can be further different between the sizes of the free capacity area in the non-volatile memory unit. When the free capacity area is sufficient, a data format after conversion is selected, and when the free capacity area is not sufficient, another data format after conversion is selected. In this case, the MFP 1 includes a free capacity area determining unit.

In addition, in FIG. 4A, the data format after conversion is different between "DOMESTIC MARKET MODEL" for "COLOR IMAGES" and "MONOCHROME IMAGES". As shown in FIG. 4A, for example, when the MFP 1 is a "DOMESTIC MARKET MODEL" at "NON-PRESENCE OF HDD", the data format after conversion is "PDF" in "COLOR IMAGES", and the data format after conversion is "TIFF" in "MONOCHROME IMAGES".

When the MFP 1 is a "DOMESTIC MARKET MODEL" for "MONOCHROME IMAGES" (the MFP 1 includes a unit for printing out grey images), since the amount of the image data to be processed is small, it is preferable that the data format be obtained by considering a high-quality image. Therefore, as shown in FIG. 4A, a TIFF format has been set beforehand in the data format conversion table 131. In the "TIFF" format, a high-quality image can be obtained by hardly or not applying a compression process to the image data.

When the MFP 1 is a "DOMESTIC MARKET MODEL" for "COLOR IMAGES" (the MFP 1 includes a unit for printing out color images), since the amount of the image data to be processed is large, it is preferable that the data format be obtained by considering compression of image data. Therefore, as shown in FIG. 4A, a PDF format has been set beforehand in the data format conversion table 131. In the "PDF" format, the image data are compressed in a proper degree.

As described above, the data format after conversion is different between cases in which the MFP 1 is a model for processing color images and the MFP 1 is a model for processing monochrome images. That is, the MFP 1 includes a model determining unit which determines whether the MFP 1 is a model for processing color images or monochrome images, and the data format conversion table 131 in which the data format after conversion has been set beforehand depending on cases in which the MFP 1 is a model for processing color images or monochrome images.

As described above, since an optimum data format can be obtained depending on the processing capability information whether the MFP1 is a model for processing color images or monochrome images, the operability and convenience by a user can be increased in operations of the MFP 1.

Next, a case is described. In this case, the data formats after conversion are different from each other between a domestic market model and an overseas market model. In this case, as the compression format, for example, an LZH format is used in the domestic market, and a ZIP format is used in the overseas market. That is, the data format is different among countries, for example, in the Japanese domestic market, the LZH format has been widely used, and in the overseas market, the ZIP format has been widely used.

Therefore, the MFP 1 includes a model destination determining unit which determines whether an MFP is a model for the domestic market or an overseas market and the data format conversion table 131 in which the data format after conversion has been set beforehand depending on cases in which the MFP 1 is a model for the domestic market or the overseas market.

In the data format conversion table 131 shown in FIG. 4A, as described above, the data format is described by an LZH format for the domestic market model and is described by a ZIP format for the overseas market model.

As described above, since an optimum data format can be obtained depending on the processing capability information whether the MFP1 is a model for the domestic market or the overseas market, the operability and convenience by a user can be increased in operations of the MFP 1.

As described above, in the data format conversion table 131 shown in FIG. 4A, the processing capability information of the MFP 1 is correlated with the data format after conversion information. However, the contents of the data format conversion table 131 are not limited to those shown in FIG. 4A.

That is, the data format conversion table 131 shown in FIG. 4B further includes "PRESENCE OF PDF(TIFF) UNIT" and "NON-PRESENCE OF PDF(TIFF) UNIT" at "NON-PRESENCE OF HDD". When the data format is converted into a PDF data format, the MFP 1 needs the PDF unit 161, and when the data format is converted into a TIFF data format, the MFP 1 needs the TIFF unit 162.

As described above, the data format conversion controlling section 121 obtains the data format after conversion information from the data format conversion table 131 which information is correlated with the processing capability information of the MFP 1 determined by the connection optional device determining unit 122 and the apparatus information determining unit 123. Then the data format conversion controlling section 121 converts the data format of the image data input from the data inputting section 110 into the data format after conversion.

[Data Format Conversion Determining Table]

Next, the data format conversion determining table 132 is described. FIG. 5 is the data format conversion determining table 132.

The data format conversion determining table 132 is a convertible data format information storing unit in which information of data format before conversion of image data is correlated with information of the data format after conversion. That is, the data format conversion determining table 132 is used to determine whether a data format before conversion can be converted into a data format after conversion.

As shown in FIG. 5, for example, a data format "RAW (RGB)" before conversion can be converted into any one of data formats after conversion. In addition, a data format "RAW(MONOCHROME)" before conversion can be converted into any one of data formats after conversion other than data formats "RAW (RGB)" and "RGB" after conversion.

The data format conversion controlling section 121 determines whether a data format before conversion of image data input from the data inputting section 110 is converted into a data format after conversion by using the data format conversion table 131, and further determines whether the determined data format after conversion is convertible by referring to the data format conversion determining table 132. When the determined data format after conversion is convertible by referring to the data format conversion determining table 132, the data format conversion controlling section 121 can convert the data format of the input image data into the data format after conversion determined by referring to the data format conversion determining table 132.

As described above, the data format conversion determining table 132 stores information of the data formats before conversion of the input image data and information of the data formats of the image data after conversion by being correlated with each other.

[First Example of Data Format Conversion Priority Order Table]

Next, referring to FIG. 6, a first example of the data format conversion priority order table 133 is described. FIG. 6 is a table showing the first example of the data format conversion priority order table 133.

In the first example of the data format conversion priority table 133, the data formats after conversion are arranged in the order of descending priorities. That is, the data format conversion priority table 133 stores information of the data formats after conversion of the image data and the priority orders of the corresponding data formats by being correlated with each other. In FIG. 6, the data format "RAW(RGB)" after conversion has the highest priority.

The data format conversion controlling section 121 determines whether a data format before conversion (for example, "RAW(MONOCHROME)" of image data input from the data inputting section 110 is converted into a data format after conversion (for example, "RAW(RGB)" by using the data format conversion table 131, and further determines whether the determined data format after conversion "RAW(RGB)" is convertible by referring to the data format conversion determining table 132. In the data format conversion determining table 132, since the data format before conversion "RAW (MONOCHROME)" cannot be converted into the data format after conversion "RAW(RGB)", the data format before conversion "RAW(MONOCHROME)" can be converted into the data format after conversion "RAW(MONOCHROME)" whose priority order is lower than the data format after conversion "RAW(RGB)" by referring to the data format conversion priority order table 133.

[Second and Third Examples of Data Format Conversion priority Order Table]

Next, referring to FIGS. 7A and 7B, second and third examples of the data format conversion priority order table 133 are described. FIG. 7A is a table showing the second example of the data format conversion priority order table 133, and FIG. 7B is a table showing the third example of the data format conversion priority order table 133.

In FIG. 7A, the priority order is determined so that a high quality image is obtained, and in FIG. 7B, the priority order is determined so that a high compression rate is obtained.

Since the plural data format conversion priority tables 133 are provided, a user can select one of the plural data format conversion priority tables 133 by considering image quality. That is, convenience by a user can be increased in operations of the MFP 1. In this case, the MFP 1 includes a selecting unit for selecting one of the plural data format conversion priority tables 133.

The data outputting section 140 (data storing section) outputs image data whose data format has been converted by the data format conversion controlling section 121. The data outputting section 140 corresponds to, for example, the FCU 5 shown in FIG. 2, and transmits the image data having a data format after conversion to an external apparatus (not shown) via a network (not shown). In addition, the data outputting section 140 corresponds to, for example, the HDD 47 shown in FIG. 2, and stores the image data having a data format after conversion in the HDD 47 itself.

The data format conversion candidate designating section 150 designates a candidate of a data format after conversion when the data format conversion controlling section 121 converts a data format before conversion of image data into a data format after conversion. For example, a user designates a candidate of a data format after conversion on the operating section 2 shown in FIG. 2 by using, for example, the keyboard.

With this, the MFP 1 converts the data format of the image data input from the data inputting section 110 (corresponding to the document reading section 3 shown in FIG. 1) into the data format after conversion.

[First Example of Data Format Conversion Process]

Figure 8:
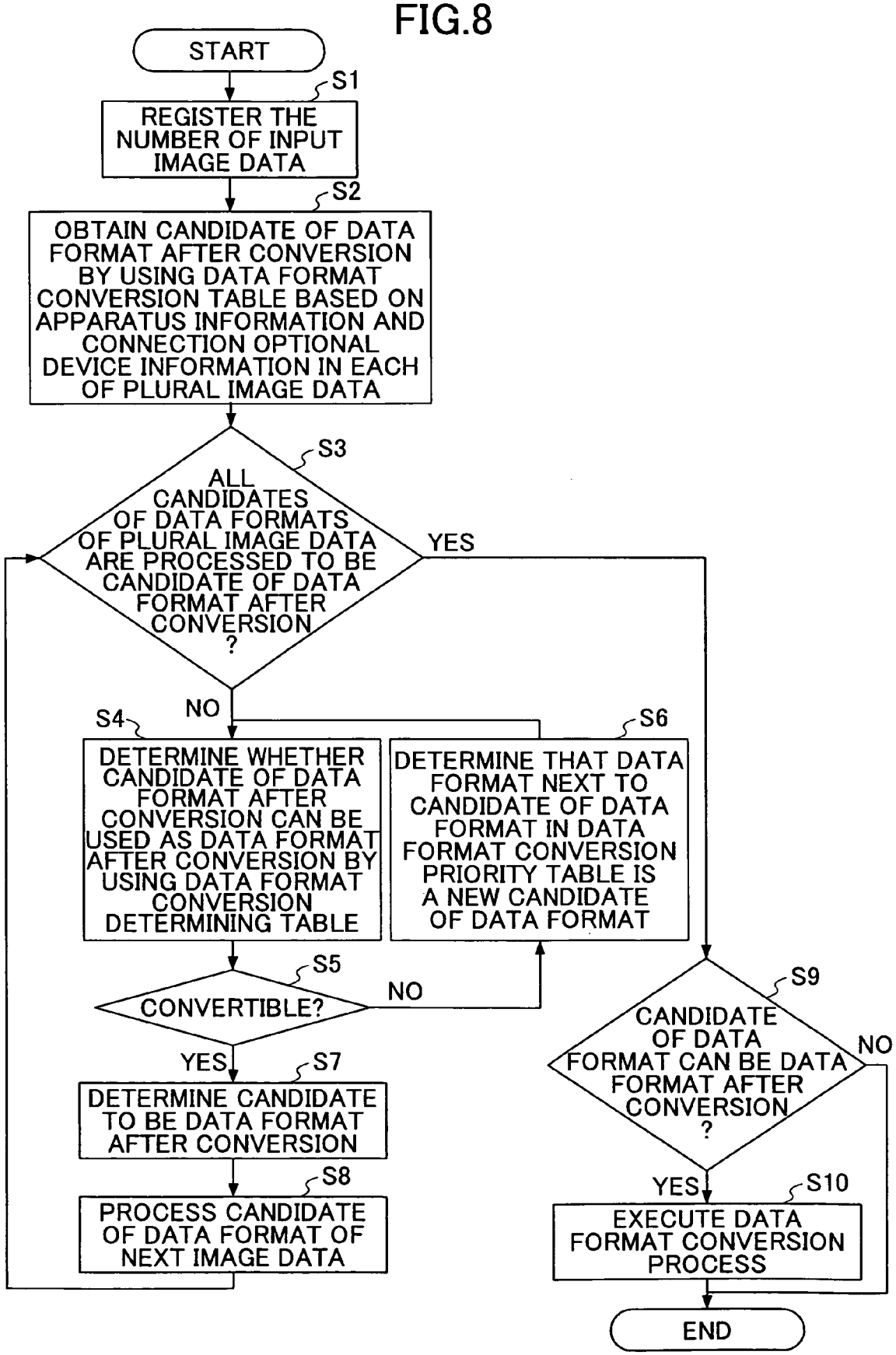
FIG. 8 is a flowchart showing a first example of a data format conversion process according to the embodiment of the present invention.

FIG. 8 is a flowchart showing a first example of a data format conversion process according to the embodiment of the present invention.

In the first example, plural image data whose data formats are two or more input from the data inputting section 110 are converted into image data having one data format.

First, the data format conversion controlling section 121 registers the number of the input image data (S1). The number of the input image data is the number of image data input from the data inputting section 110.

The data format conversion controlling section 121 obtains a candidate of a data format after conversion by using the data format conversion table 131 based on the apparatus information and the connection optional device information in each of the plural image data (S2). In this, the candidate of the data format after conversion is obtained by using the processing capability information of the MFP 1 determined by the connection optional device determining unit 122 and the apparatus information determining unit 123 and by referring to the data format conversion table 131. As described above, the processing capability information includes a destination of the MFP 1 (domestic market model or overseas market model), processing ability (of color images or monochrome images), information of the connected optional device (presence of HDD or non-presence of HDD), and so on.

Next, the data format conversion controlling section 121 determines whether all the candidates of the data formats of the plural image data are processed to be a candidate of a data format after conversion (S3).

When all the candidates of the data formats of the plural image data are not processed to be a candidate of a data format after conversion (NO in S3), the data format conversion controlling section 121 determines whether the candidate of the data format after conversion can be used as a data format after conversion by using the data format conversion determining table 132 (S4). In S4, the data format conversion controlling section 121 processes one of the plural data formats of the corresponding plural input image data.

When the candidate of the data format after conversion cannot be used as a data format after conversion by using the data format conversion determining table 132 (NO in S5), the data format conversion controlling section 121 determines that a data format next to the candidate of the data format in the data format conversion priority order table 133 is a new candidate of the data format after conversion (S6). Then the process returns to S4.

When the candidate of the data format after conversion can be used as a data format after conversion by using the data format conversion determining table 132 (YES in S5), the data format conversion controlling section 121 determines that the candidate of the data format is the data format after conversion (S7). Then the data format conversion controlling section 121 processes a candidate of a data format of next image data (S8). That is, the process returns to S3.

In the processes from S4 through S8, one candidate of the data format after conversion is determined.

When all the candidates of the data formats of the plural image data are processed (YES in S3), the data format conversion controlling section 121 determines whether the candidate of the data format of the plural image data can be a data format after conversion of the plural image data (S9). When the candidate of the data format of the plural image data can be a data format after conversion of the plural image data (YES in S9), the data format conversion controlling section 121 executes a data format conversion process (S10). When the candidate of the data format of the plural image data cannot be a data format after conversion of the plural image data (NO in S9), the data format conversion controlling section 121 does not execute the data format conversion.

As described above, in the MFP 1, the plural image data whose data formats are two or more input from the data inputting section 110 are converted into image data having one data format. The plural image data whose data format is made to be one data format are output (stored) by the data outputting section (data storing section) 140.

As described above, since the MFP 1 can obtain an optimum candidate of a data format from plural image data by using the apparatus information and the connection optional device information, a complicated selection process of the candidate of the data format is not needed. Therefore, the operability and convenience by a user can be increased in operations of the MFP 1. That is, by using the data format conversion determining table 132 shown in FIG. 5 and the data format conversion priority table 133 shown in FIG. 6, complexity for selecting a data format after conversion can be avoided. In addition, when image data having one data format are generated from plural image data whose data formats are different from each other, the one data format of the plural image data can be easily determined.

[Second Example of Data Format Conversion Process]

Figure 9:
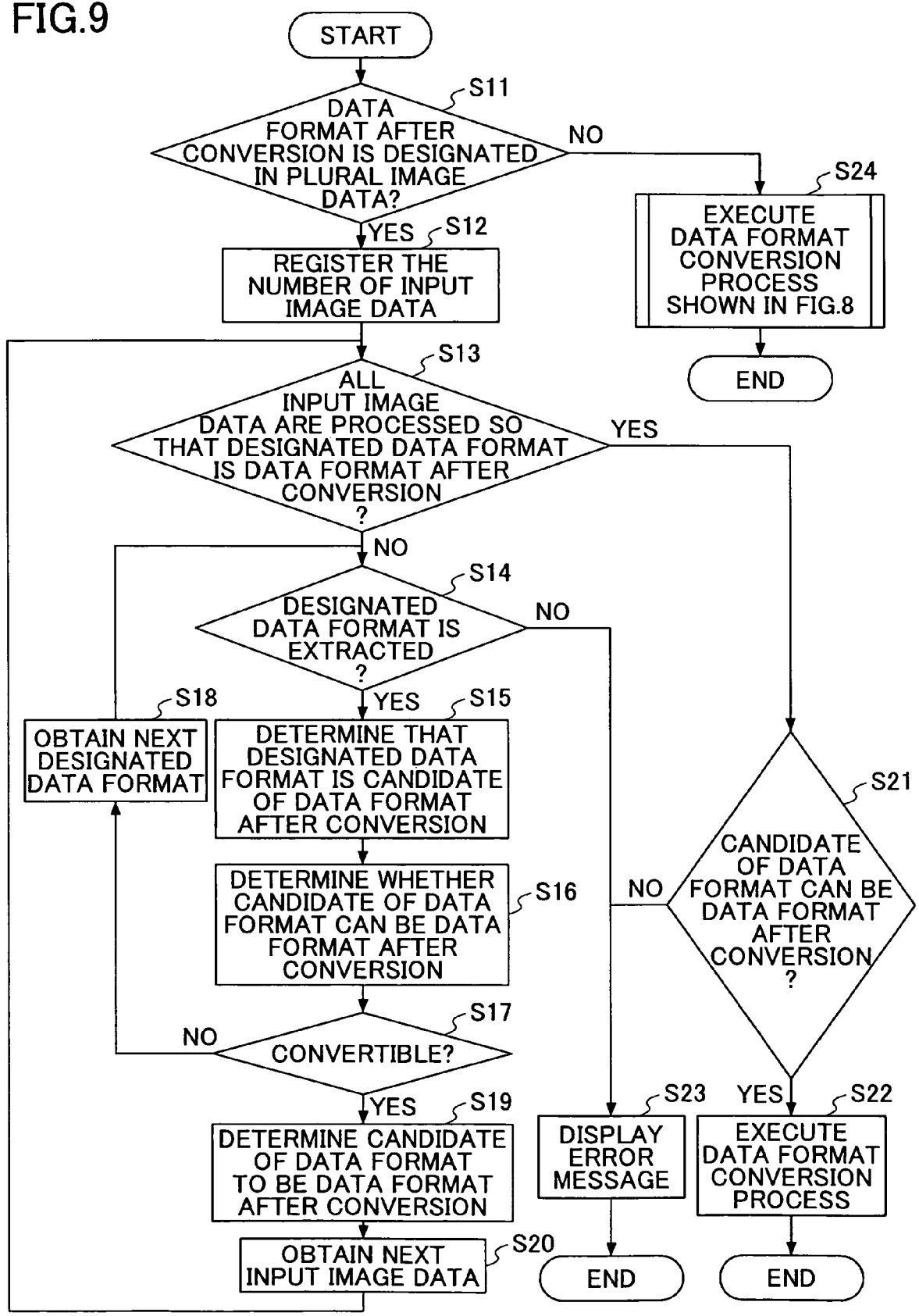
FIG. 9 is a flowchart showing a second example of the data format conversion process according to the embodiment of the present invention.

FIG. 9 is a flowchart showing a second example of the data format conversion process according to the embodiment of the present invention.

In the second example, in addition to the first example, a data format after conversion of plural image data is designated.

First, the data format conversion candidate designating section 150 determines whether a data format after conversion is designated in the plural image data (S11). In this, the data format conversion candidate designating section 150 determines whether a user designates a data format after conversion of the plural image data on the operating section 2.

In S11, for example, when image data generated by processes in the MFP 1 based on a facsimile transmission instruction by a user on the operating section 2 are transmitted by using the FCU 5, a data format by which the FCU 5 can transmit the image data is designated. In this case, in G3 facsimile, an MH data format or an MR data format is designed, and in G4 facsimile, an MMR data format is designated.

When a data format after conversion of the plural image data is not designated (NO in S11), the data format conversion process shown in FIG. 8 is executed (S24).

When a data format after conversion of the plural image data is designated (YES in S11), the data format conversion controlling section 121 registers the number of the input image data (S12). The number of the input image data is the number of image data input from the data inputting section 110.

Next, the data format conversion controlling section 121 determines whether all the input image data are processed so that the designed data format is a data format after conversion (S13).

When all the input image data are not exactly processed (NO in S13), the data format conversion controlling section 121 determines whether the designated data format is extracted (S14). When the designated data format is not extracted (NO in S14), the data format conversion controlling section 121 displays an error message on the operating section 2 (S23). In S14, when plural designated data formats exist, one of the plural designated data formats is extracted.

When the designated data format is extracted (YES in S14), the data format conversion controlling section 121 determines that the designated data format is a candidate of the data format after conversion (S15). Then the data format conversion controlling section 121 determines whether the candidate of the data format can be the data format after conversion by using the data format conversion determining table 132 (S16).

When the candidate of the data format cannot be the data format after conversion (NO in S17), the data format conversion controlling section 121 obtains a next designated data format (S18). Then, in S14, the next designated data format is extracted.

When the candidate of the data format can be the data format after conversion (YES in S17), the data format conversion controlling section 121 determines that the candidate of the data format is the data format after conversion (S19). Then the data format conversion controlling section 121 obtains next input image data (S20). Then the data format conversion controlling section 121 processes the next input image data (S13).

When all the input image data are processed (YES in S13), the data format conversion controlling section 121 determines whether the candidate of the data format determined in S14 through S20 can be a data format after conversion (S21).

When the candidate of the data format determined in S14 through S20 can be a data format after conversion (YES in S21), the data format conversion controlling section 121 executes the data format conversion process (S22). When the candidate of the data format determined in S14 through S20 cannot be a data format after conversion (NO in S21), the data format conversion controlling section 121 displays an error message on the operating section 2 (S23).

As described above, in the second example, a data format after conversion can be designated in addition to the data format conversion process in the first example. Therefore, a data format having higher priority for a user than those described in the data format conversion priority order table 133 can be determined.

Further, the present invention is not limited to the specifically disclosed embodiment, and variations and modifications may be made without departing from the scope of the present invention.

The present invention is based on Japanese Priority Patent Application No. 2007-230510, filed on Sep. 5, 2007, with the Japanese Patent Office, the entire contents of which are hereby incorporated herein by reference.

What is claimed is:

1. An information processing apparatus which converts input image data having a data format before conversion into image data having a data format after conversion, comprising:
 a data format storing unit which stores processing capability information of the information processing apparatus and information of the data formats after conversion by correlating the processing capability information with the information of the data formats after conversion;
 a processing capability information determining unit which determines the processing capability information of the information processing apparatus; and
 a data format conversion controlling unit which converts the input image data having the data format before conversion into the image data having the data format after conversion based on the determined result by the processing capability information determining unit by referring to the data format storing unit.

2. The information processing apparatus as claimed in claim 1, wherein:
 when the input image data are plural image data having corresponding plural data formats before conversion,
 the data format conversion controlling unit converts the plural image data having the corresponding plural data formats before conversion into image data having one data format after conversion.

3. The information processing apparatus as claimed in claim 1, further comprising:
 a convertible data format information storing unit which stores information of the data formats before conversion and information of convertible data formats after conversion by correlating with each other; wherein
 the data format conversion controlling unit converts the input image data having the data format before conversion into the image data having the data format after conversion when the input image data having the data format before conversion can be converted into the image data having the data format after conversion by referring to the convertible data format information storing unit.

4. The information processing apparatus as claimed in claim 3, further comprising:
 a data format conversion priority order storing unit which stores priority order of the data formats after conversion; wherein
 when the input image data having the data format before conversion cannot be converted into the image data having the data format after conversion by referring to the convertible data format information storing unit, the data format conversion controlling unit converts the input image data having the data format before conversion into the image data having the data format after conversion by lowering the priority order with reference to the data format conversion priority order storing unit.

5. The information processing apparatus as claimed in claim 1, further comprising:
 a data format conversion candidate designating unit which designates a candidate of the data format after conversion; wherein
 the data format conversion controlling unit designates the candidate of the data format after conversion by using the data format conversion candidate designating unit.

6. The information processing apparatus as claimed in claim 1, wherein:
 the processing capability information includes information of a storage unit of the information processing apparatus; and
 the information of the data formats after conversion stored in the data format storing unit is different between a case where the storage unit has a free capacity of a predetermined capacity or more and a case where the storage unit has a free capacity less than the predetermined capacity or the information processing apparatus does not include the storage unit.

7. The information processing apparatus as claimed in claim 1, wherein:
 the processing capability information includes information of a printout unit of the image data having the data format after conversion; and
 the information of the data formats after conversion stored in the data format storing unit is different between a case where the printout unit prints out color image data and a case where the printout unit prints out monochrome image data.

8. The information processing apparatus as claimed in claim 1, wherein:
 the processing capability information includes information of a destination of the information processing apparatus; and
 the information of the data formats after conversion stored in the data format storing unit is different between differences of corresponding destinations of the information processing apparatuses.

9. An information processing method in an information processing apparatus which converts input image data having a data format before conversion into image data having a data format after conversion, comprising:
 a data format storing step which stores processing capability information of the information processing apparatus and information of the data formats after conversion by correlating the processing capability information with the information of the data formats after conversion;
 a processing capability information determining step which determines the processing capability information of the information processing apparatus; and
 a data format conversion controlling step which converts the input image data having the data format before conversion into the image data having the data format after conversion based on the determined result by the processing capability information determining step by referring to the data format storing step.

10. The information processing method as claimed in claim 9, wherein:
 when the input image data are plural image data having corresponding plural data formats before conversion,
 the data format conversion controlling step converts the plural image data having the corresponding plural data formats before conversion into image data having one data format after conversion.

11. The information processing method as claimed in claim 9, further comprising:
a convertible data format information storing step which stores information of the data formats before conversion and information of convertible data formats after conversion by correlating with each other; wherein
the data format conversion controlling step converts the input image data having the data format before conversion into the image data having the data format after conversion when the input image data having the data format before conversion can be converted into the image data having the data format after conversion by referring to the convertible data format information storing step.

12. The information processing method as claimed in claim 11, further comprising:
a data format conversion priority order storing step which stores priority order of the data formats after conversion; wherein
when the input image data having the data format before conversion cannot be converted into the image data having the data format after conversion by referring to the convertible data format information storing step, the data format conversion controlling step converts the input image data having the data format before conversion into the image data having the data format after conversion by lowering the priority order with reference to the data format conversion priority order storing step.

13. The information processing method as claimed in claim 9, further comprising:
a data format conversion candidate designating step which designates a candidate of the data format after conversion; wherein
the data format conversion controlling step designates the candidate of the data format after conversion by using the data format conversion candidate designating step.

14. The information processing method as claimed in claim 9, wherein:
the processing capability information includes information of a storage unit of the information processing apparatus; and
the information of the data formats after conversion stored by the data format storing step is different between a case where the storage unit has a free capacity of a predetermined capacity or more and a case where the storage unit has a free capacity less than the predetermined capacity or the information processing apparatus does not include the storage unit.

15. The information processing method as claimed in claim 9, wherein:
the processing capability information includes information of a printout step of the image data having the data format after conversion; and
the information of the data formats after conversion stored by the data format storing step is different between a case where the printout step prints out color image data and a case where the printout step prints out monochrome image data.

16. The information processing method as claimed in claim 9, wherein:
the processing capability information includes information of a destination of the information processing apparatus; and
the information of the data formats after conversion stored by the data format storing step is different between differences of corresponding destinations of the information processing apparatuses.

17. A computer-readable recording medium storing an information processing program in an information processing apparatus which converts input image data having a data format before conversion into image data having a data format after conversion, wherein:
the information processing program includes
a data format storing step which stores processing capability information of the information processing apparatus and information of the data formats after conversion by correlating the processing capability information with the information of the data formats after conversion;
a processing capability information determining step which determines the processing capability information of the information processing apparatus; and
a data format conversion controlling step which converts the input image data having the data format before conversion into the image data having the data format after conversion based on the determined result by the processing capability information determining step by referring to the data format storing step.

18. The computer-readable recording medium storing the information processing program in the information processing apparatus as claimed in claim 17, wherein:
in the information processing program,
when the input image data are plural image data having corresponding plural data formats before conversion,
the data format conversion controlling step converts the plural image data having the corresponding plural data formats before conversion into image data having one data format after conversion.

19. The computer-readable recording medium storing the information processing program in the information processing apparatus as claimed in claim 17, wherein:
the information processing program further includes
a convertible data format information storing step which stores information of the data formats before conversion and information of convertible data formats after conversion by correlating with each other; wherein
the data format conversion controlling step converts the input image data having the data format before conversion into the image data having the data format after conversion when the input image data having the data format before conversion can be converted into the image data having the data format after conversion by referring to the convertible data format information storing step.

20. The computer-readable recording medium storing the information processing program in the information processing apparatus as claimed in claim 17, wherein:
the information processing program further includes
a data format conversion priority order storing step which stores priority order of the data formats after conversion; and
when the input image data having the data format before conversion cannot be converted into the image data having the data format after conversion by referring to the convertible data format information storing step, the data format conversion controlling step converts the input image data having the data format before conversion into the image data having the data format after conversion by lowering the priority order with reference to the data format conversion priority order storing step.

* * * * *